UNITED STATES PATENT OFFICE.

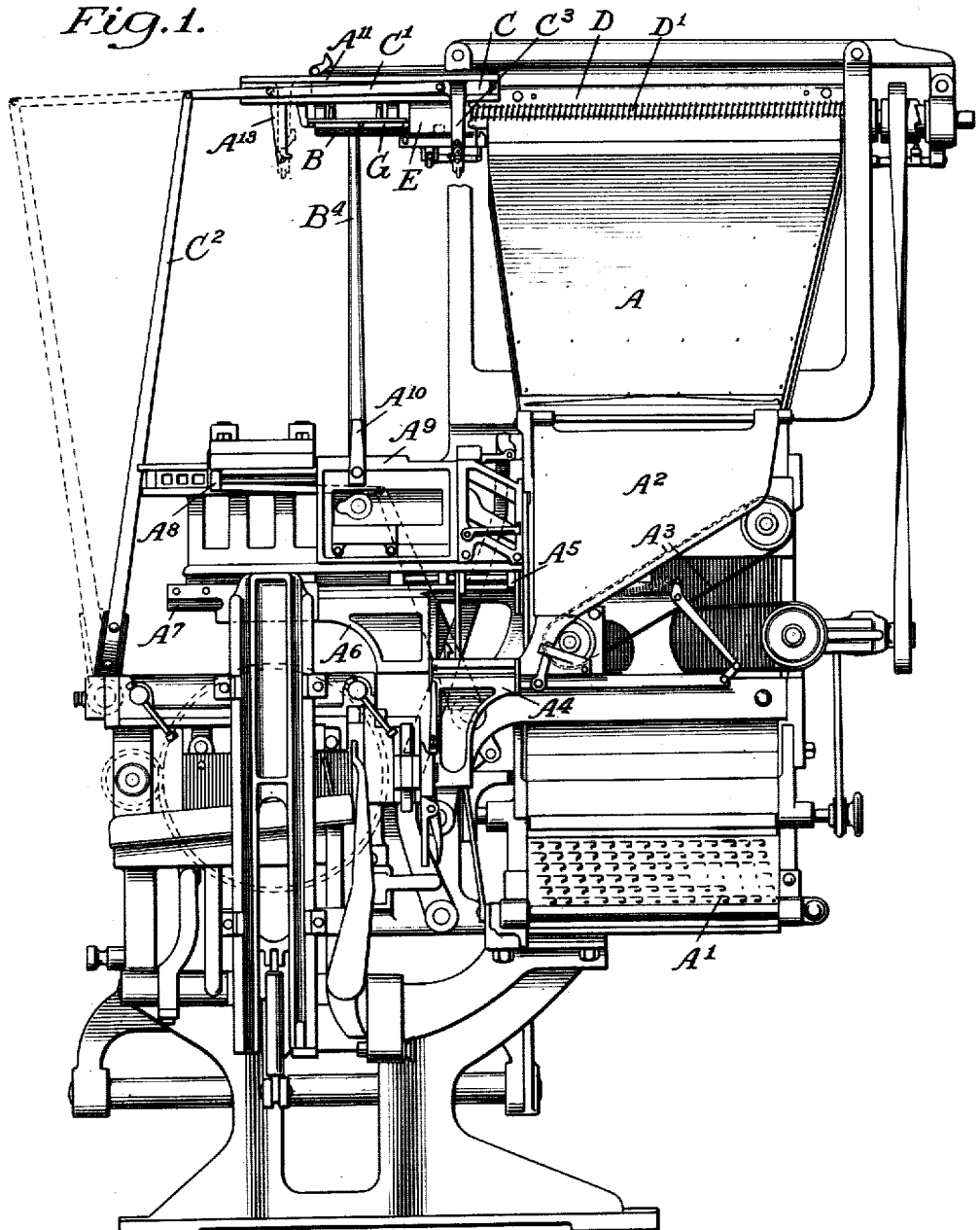

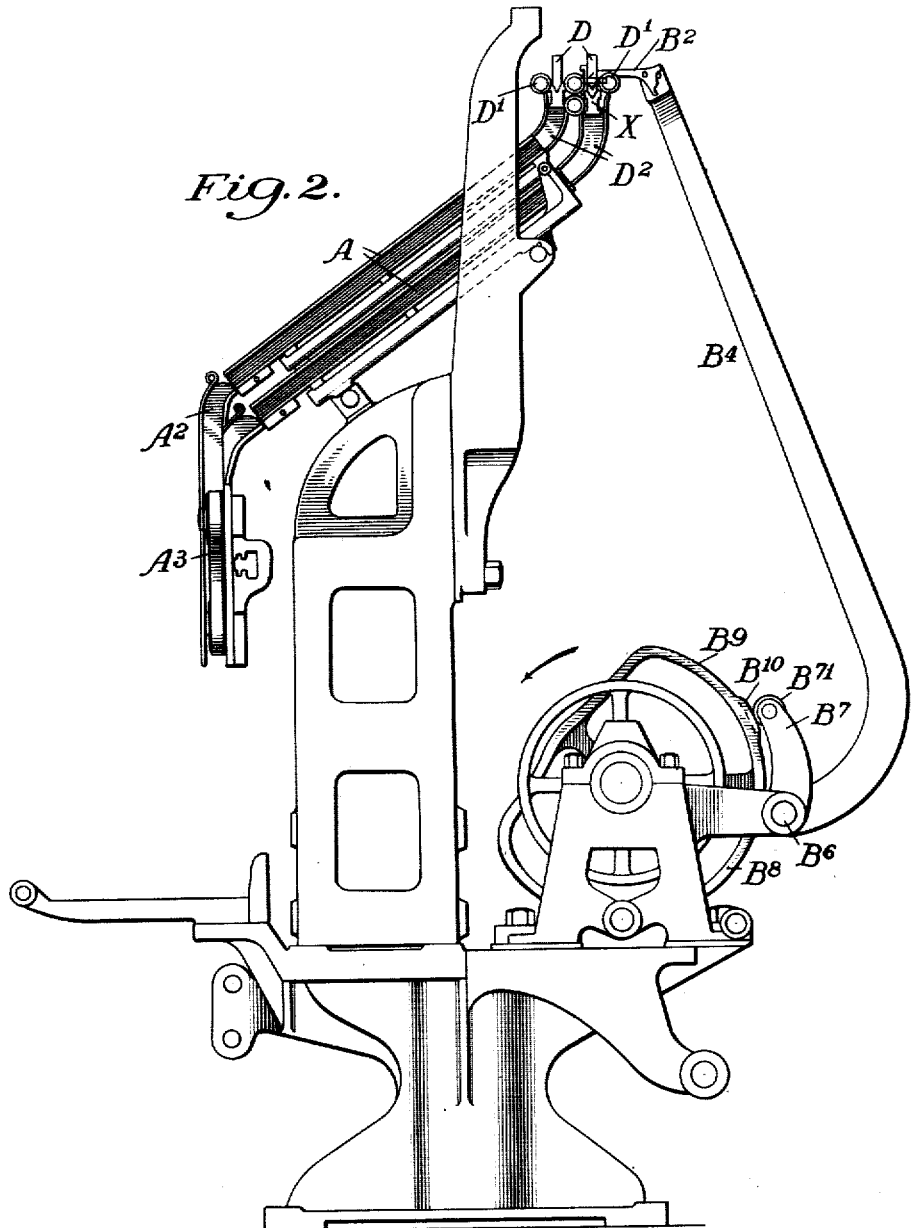

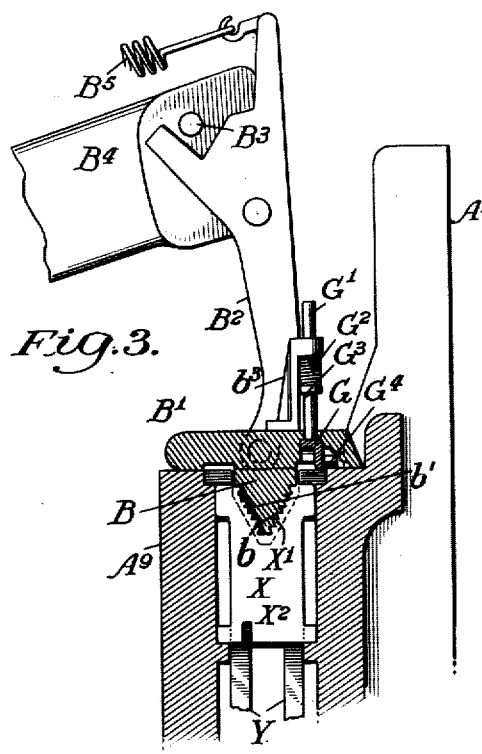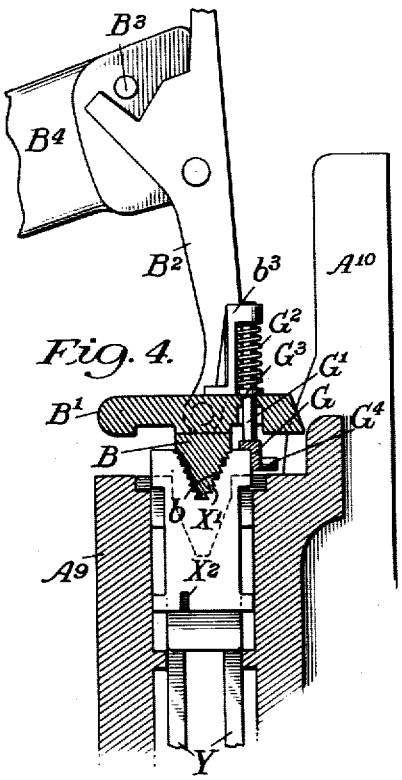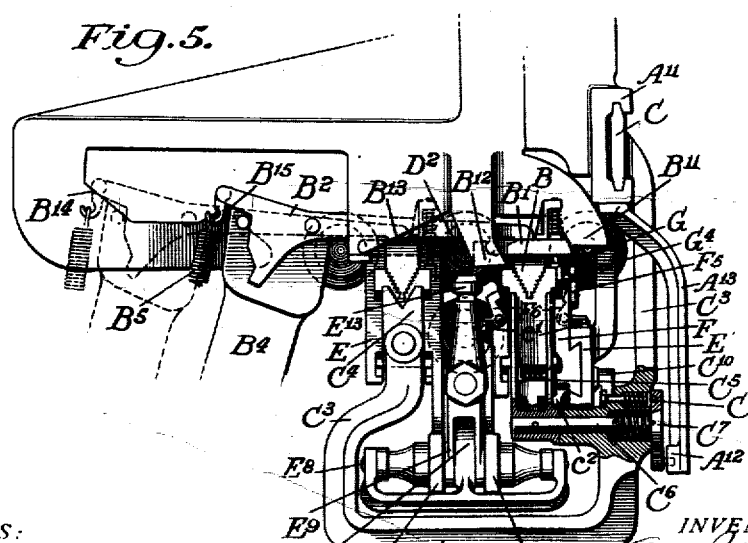

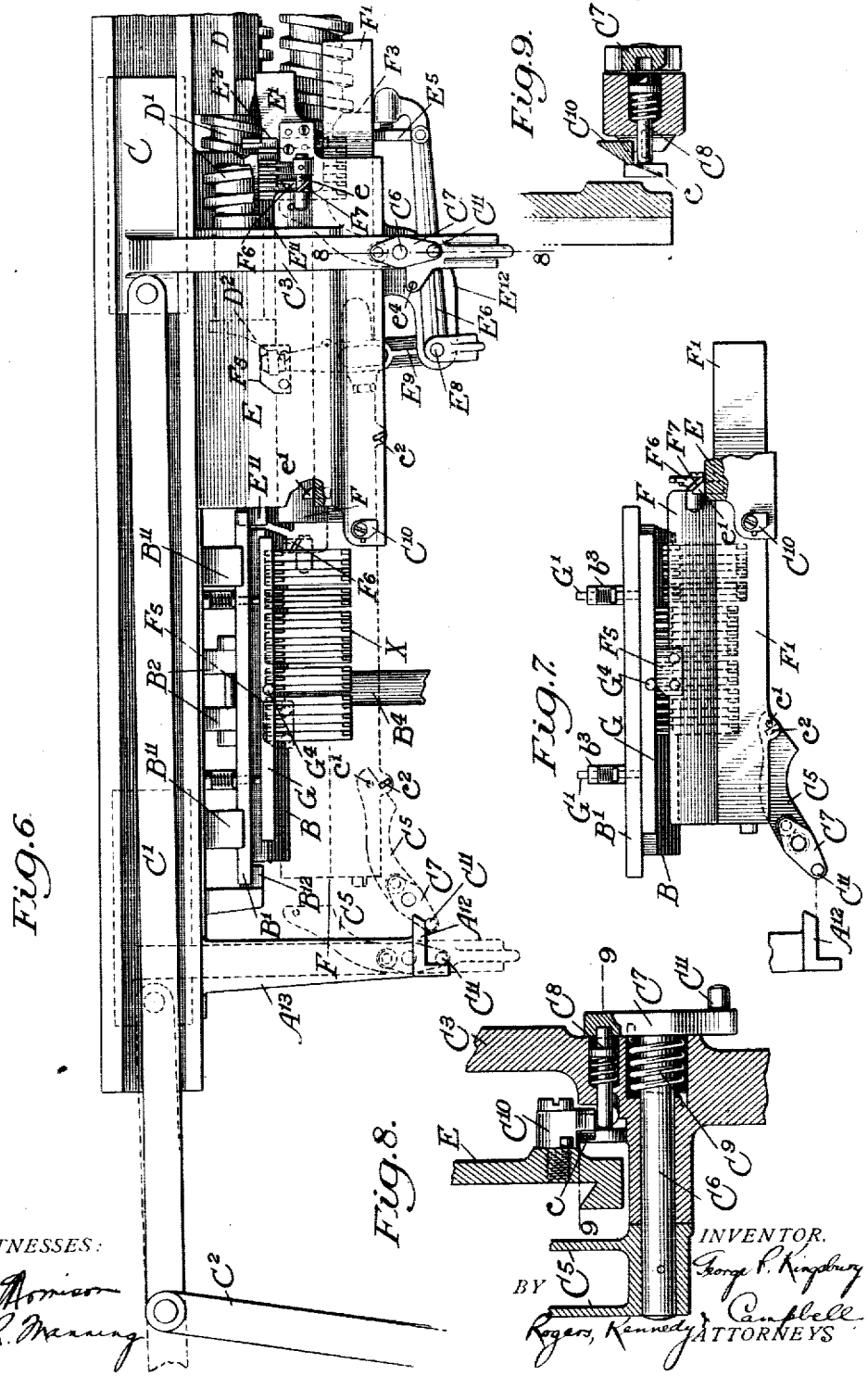

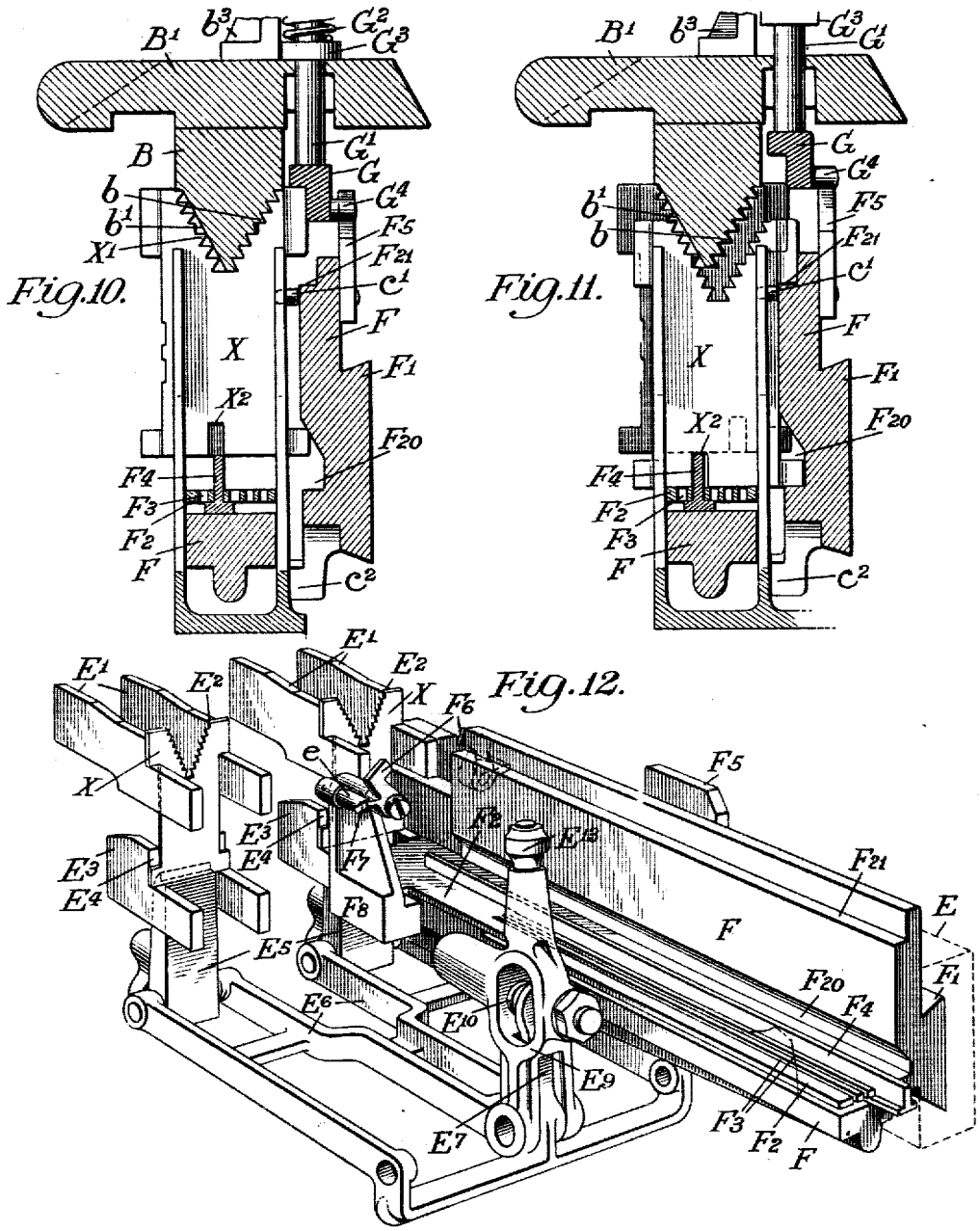

GEORGE P. KINGSBURY, OF BROOKLYN, NEW YORK, ASSIGNOR TO MERGENTHALER LINOTYPE COMPANY, A CORPORATION OF NEW YORK.

TYPOGRAPHICAL MACHINE.

1,271,723.   Specification of Letters Patent.   Patented July 9, 1918.

Application filed March 26, 1917. Serial No. 157,421.

*To all whom it may concern:*

Be it known that I, GEORGE P. KINGSBURY, a citizen of the United States, residing at Brooklyn, in the county of Kings and State of New York, have invented certain new and useful Improvements in Typographical Machines, of which the following is a specification, reference being had therein to the accompanying drawing.

My invention relates to typographical machines, such as linotype machines of the general organization represented in Letters Patent of the United States No. 436,532, to O. Mergtenthaler, wherein circulating matrices are released from a magazine in the order in which their characters are to appear in print and then assembled in line, the composed line transferred to the face of a mold, the mold filled with molten metal to form a slug or linotype against the matrices which produce the type characters thereon, and the matrices thereafter returned through distributing mechanism to the magazine from which they started. More particularly, it relates to machines equipped with a plurality of magazines containing matrices of different fonts and with distributing mechanism coöperating continuously with all of the magazines so as to restore the matrices thereto at all times and irrespective of the one in use. My invention contemplates an improved form of distributing mechanism for use in such machines, as will be fully pointed out in the detailed description to follow.

Referring to the drawings:

Figure 1 is a front view of a linotype machine having my invention applied thereto;

Fig. 2 is a side elevation thereof (certain parts being omitted) and showing in particular the configuration of the operating cam for the second elevator;

Fig. 3 is a vertical section taken through the second elevator bar and the upper transfer channel at the time the matrix line is transferred thereto from the first elevator;

Fig. 4 is a similar view but taken at a later period, when the second elevator has begun its upward travel;

Fig. 5 is an end view of the distributing apparatus with the second elevator coöperating therewith;

Fig. 6 is a front view of the parts shown in Fig. 5;

Fig. 7 is a detached front view of the second elevator bar and font separating devices showing these parts in the relative positions they occupy during the separation of the matrices according to font;

Fig. 8 is a section of the line transfer devices taken on the line 8—8 of Fig. 6;

Fig. 9 is a section on the line 9—9 of Fig. 8;

Fig. 10 is an enlarged vertical section taken through the second elevator bar and font selecting devices at one stage of the operation;

Fig. 11 is a similar view taken at another stage of the operation; and

Fig. 12 is a detached perspective skeleton view of the matrix lifting devices which feed the matrices to the several distributers.

The matrices X are stored according to font in the stationary magazines A, two of which are illustrated therein, although a greater number may be employed if desired. The matrices are released from either magazine by the manipulation of the keyboard $A^1$, whence they pass down or through the channeled raceway or front plate $A^2$ onto the inclined assembling belt $A^3$ which delivers them to the assembler $A^4$ wherein they are composed in line. When the composition of the line is completed, the assembler $A^4$ is raised and the line removed therefrom by the delivery carriage $A^5$ and transported through the intermediate channel $A^6$ to the first elevator $A^7$, which thereupon descends and presents the line to the casting mechanism for the production of the slug. After casting, the first elevator is raised and arrested in registration with the upper transfer channel $A^9$, into which the line is shifted by the transfer device $A^8$. As the line is shifted into the upper transfer channel $A^9$, the customary distributing teeth $X^1$ at the upper ends of the matrices are caused to engage with the sustaining ribs on the second elevator bar B, which at that time is located within the channel. Thereafter, the second elevator rises and carries the matrices upward for delivery to one or the other of the two parallel distributers D arranged one behind the other above the magazines A.

The distributers as usual are made up of longitudinally ribbed or permuted bars and a system of conveying screws $D^1$ for propelling the matrices therealong. As the matrices are carried along the bars, they are released at different points according to character and dropped into the underlying magazine entrances $D^2$ which conduct them to their proper channels in the magazines. The parts so far described and their mode of operation are or may be of any well known construction.

In being presented to the distributers, the matrices are shifted laterally (by suitable transfer devices) through the ordinary distributer boxes E, one for each distributer. Each box is provided (Fig. 6) with the customary ribbed bar $E^{11}$ and with the supporting or guiding rails $E^1$ and $E^3$, which latter are formed with fixed stops $E^2$ and $E^4$ (see also Fig. 12). The location of the stops is such that the individual matrices, as they reach the exit of the box, are arrested above the reciprocating fingers $E^5$, which immediately lift them above the stops and into engagement with the threads of the distributer screws $D^1$. The screws thereupon carry the detached matrices forwardly along the extended portions of the rails $E^1$ onto the corresponding distributer bars D. Thus far, the distributer boxes are of the regular construction.

In the present instance, however, I have modified the mounting and operation of the lifting fingers $E^5$, which formerly were operated from different distributer screws through separate and independent trains of connections. In accordance with my invention, the two fingers are carried by an integral yoke or frame $E^6$, which is pivotally mounted upon a rod $E^8$ fixed to a pair of lugs or projections $E^{12}$ projecting downwardly from the two distributer boxes (Figs. 5 and 6). The rocking of the frame $E^6$ is effected by means of a single lever or shank $E^9$ loosely mounted upon the rod $E^8$ and straddling an arm $E^7$ rising from the frame, said arm being yieldingly connected to the lever by the spring $E^{10}$. The lever $E^9$ is provided at its upper end with a roller $E^{13}$ which is constantly maintained by a spring (not shown) in engagement with a cam $D^2$ secured to the end of the upper central screw $D^1$, the two fingers $E^5$ thus being operated simultaneously at each rotation of the distributer screws and in proper synchronism therewith. The foregoing arrangement is advantageous in that it reduces the number of parts and allows the addition of other improved devices to be described.

Referring now to the main features of my invention, the general organization of the parts is such that the second elevator presents the composed line momentarily before the forward distributer box and, under the action of font selecting means, releases such matrices at that point as belong to the forward distributer, and subsequently moves onto its normal position of rest where it presents the remaining matrices before the rear distributer box for delivery to the rear distributer. When the second elevator comes to rest, a common transfer device then pushes the two separated groups of matrices into the respective distributer boxes, from which they are fed one at a time to the corresponding distributers by the matrix lifting fingers $E^5$ before mentioned. The construction and operation of the second elevator will first be described.

As usual, the bar B is attached to the under side of the flat horizontal plate $B^1$, hinged to the forward end of the U-shaped strap or lever $B^2$ which is pivoted centrally to the long elevator arm $B^4$ and connected at its rear end to a spring $B^5$, which tends constantly to hold it in engagement with the stop pin $B^3$. The arm $B^4$ is fixed at its lower end to the rock shaft $B^6$, which is provided with the short upstanding arm $B^7$ having the roller $B^{71}$ engaged with the rotary operating cam $B^8$. When the arm $B^4$ is rocked downwardly to locate the bar B in the upper transfer channel $A^9$, the plate $B^1$ comes into engagement with the stationary cam piece $A^{10}$ (see Figs. 1, 3 and 4) and is guided thereby to its proper place upon the channel, the lever $B^2$ being rocked about its pivot against the action of the spring $B^5$ so as to assume the necessary vertical position. As the elevator is raised and the parts carried clear of the cam piece $A^{10}$, the spring $B^5$ restores them to their normal condition, with the lever $B^2$ in contact with the stop pin $B^3$. The foregoing parts and their mode of operation are substantially the same as heretofore.

The improvements are as follows: Referring to Fig. 2 (wherein the parts are shown in their position of rest), it will be noted that the operating cam $B^8$ is formed with a raised portion or protuberance $B^{10}$ which is in engagement with the roller $B^{71}$, and that in advance of the protuberance the cam is formed with an extended concentric portion $B^9$. When thus modified, as the cam (which rotates in the direction indicated by the arrow) raises the second elevator to its upper position, its concentric portion $B^9$ is first brought into engagement with the roller $B^{71}$ and consequently maintains the bar B with the composed line of matrices thereon in operative relation to the foremost distributer box for a brief period of time, during which the matrices belonging to the corresponding distributer are withdrawn from the line. As the cam, however, continues its rotation, its raised portion $B^{10}$ is brought into engagement with the roller and the elevator is moved on to bring the bar B and the matrices remaining thereon in operative relation to the rear distributer, when the parts come to rest.

Means are also provided to insure the proper positioning of the bar B with reference to the two distributer boxes. Referring particularly to Figs. 5 and 6, when the bar is presented to the first or forward distributer box, the plate $B^1$ (formed with beveled notches at its opposite edges, as shown in Fig. 5) is brought into engagement with the inclined surfaces of front and rear stops $B^{11}$ and $B^{12}$, which maintain it in a truly horizontal position, the plate being allowed to clear the front stops $B^{11}$ as it approaches such position by the engagement of the rear end of the lever $B^2$ with the fixed cam surface $B^{15}$ which rocks the lever downwardly to the required extent. The stops $B^{11}$ and $B^{12}$, due to their inclination, are also adapted, as the rearward movement of the elevator is continued, to raise the bar B slightly in order to clear the matrices which have been released therefrom. As the elevator approaches the rear distributer box, a beveled cut in the plate B (indicated by the dotted lines in Figs. 5 and 10) engages a cam surface $B^{13}$ which guides it to its proper horizontal position before the box, this guiding action being assisted by the further engagement of the rear end of the lever $B^2$ with another cam surface $B^{14}$.

The manner in which the matrices belonging to the first distributer may be released from the second elevator will now be described. As shown particularly in Figs. 3 and 4 and 10 and 11, the bar B (which is of the usual V-shape form) is provided with sustaining ribs $b$ at its forward side only, the rear side being plain, as indicated at $b^1$. Consequently, when the matrices are shifted onto the bar from the first elevator, they are engaged therewith at one side only and, unless means were otherwise provided would be free to become disengaged from the bar when it leaves the upper transfer channel. The elevator is therefore equipped with a locking plate G to retain the matrices on the bar until the required time, the plate being arranged at the forward side of the bar and of inverted L-shape form in cross section so as to fit over the projecting ears of the matrices and prevent them from shifting edgewise out of engagement with the bar sustaining ribs $b$. The plate G is fixed to the lower ends of two sliding plungers $G^1$ passing through openings in the supporting plate $B^1$ and small standards $b^3$ located thereon. Springs $G^2$ interposed between the standards $b^3$ and collars $G^3$ on the plungers tend constantly to shift the plate G downwardly to active position, the collars $G^3$, however, limiting the motion of the plate in this direction. When the second elevator is in its receiving position with the bar B located within the upper transfer channel $A^9$, the plate G is held upward in inactive position by the engagement of a laterally projecting lug $G^4$ thereon with the upper edge of the transfer channel and thus stands free and clear of the matrices as they enter the channel, as well as of the spacers Y which are composed in line therewith (Fig. 3). As the elevator begins to rise, however, the plate G remains in engagement with the upper transfer channel under the influence of its springs $G^2$ until the matrices are brought into engagement therewith, at which time the relative movement of the plate is completed and it is carried on upward with the elevator bar B to lock the matrices thereon (Fig. 4). Then when the elevator bar is presented opposite the first distributer box, the locking plate G is again shifted to inactive position by the font selecting means, which will now be described.

Referring particularly to Figs. 6, 7 and 12, it will be observed that the first or forward distributer box E contains a right angular supporting member F, which is connected by a dovetail $F^1$ to the forward side of the box so as to be capable of being slid longitudinally into and out of the same. The horizontal portion of the supporting member is provided with a base plate $F^2$ upon which the matrices may rest at their lower ends, while the vertical portion of said member is formed at its lower edge with a longitudinal groove $F^{20}$ to receive the lower projecting ears of the matrices, and at its upper edge with a longitudinal ledge $F^{21}$ upon which the upper ears of the matrices may rest. As thus formed, the member F is adapted to receive and give support to such matrices as are detached from the second elevator bar and to guide them to the distributer box supporting rails $E^1$ and $E^2$, with which the ledge $F^{21}$ and base plate $F^2$ are respectively alined. The base plate $F^2$ is formed with a plurality of longitudinal slots $F^3$, into any desired one of which is inserted a font selector in the form of a T-shaped bar $F^4$, whose stem portion projects upward beyond the base plate. Normally, the supporting member F is contained within the distributer box so as to be clear of the second elevator when the latter is moved to its upper position. Immediately that the elevator arrives in this position, however, the supporting member is withdrawn longitudinally from the distributer box and located beneath or in receiving relation to the matrices carried by the elevator bar B, as indicated by dotted lines in Fig. 6 and by full lines in Fig. 7. When the supporting member is retracted in this manner, the selector bar $F^4$ is positioned beneath the matrices on the elevator bar and serves either to permit or to prevent their release therefrom according to form or font, when the retaining plate G is moved to inactive position. As shown, the matrices of one font (that destined for the forward distributer) are formed in their lower ends with cuts or notches $X^2$, which are adapted to register with the selector bar, while those of the other font (destined for the rear distributer) are without such notches, being plain or solid at their lower ends.

As a result of this arrangement, when the locking plate G is raised out of engagement with the matrices, those formed with the notches $X^2$ are permitted to drop from the elevator bar to a lower level, they being free to shift edgewise to disengage their distributing teeth $X^1$ from the bar sustaining ribs $b$ (Fig. 11), while the unnotched matrices are supported at their original level by the selector bar and are thus maintained in engagement with the sustaining ribs $b$. In this way, the matrices of the two fonts are separated from each other, those of one being released from the elevator bar and dropped onto the supporting member, while those of the other are maintained in engagement with the elevator bar, and are consequently carried away by the continued movement of the elevator and presented to the rear distributer box. During this movement, the elevator bar is allowed to clear the detached matrices by the slight raising movement which is imparted thereto by the inclined stop pieces $B^{11}$, $B^{12}$ as before mentioned. The operation of the locking plate G is controlled by a cam piece $F^5$ attached to the upper edge of the supporting member F, the position of the cam piece being such that it engages the projecting lug $G^4$ of the locking plate just before the supporting member arrives in its fully withdrawn position.

When the second elevator comes to rest, as above described, the unnotched matrices, together with the previously detached notched matrices, are ready to be pushed into their respective distributer boxes for delivery to the corresponding distributers. This operation will now be dealt with. Referring particularly to Figs. 1, 5 and 6, it will be noted that there is employed the customary transfer slide C movable back and forth in fixed guideways $A^{11}$ and connected by the link $C^1$ to the long operating lever $C^2$ which is actuated by the well known spring and cam arrangement (not shown). Depending from the slide C is a rigid arm $C^3$ extending rearwardly and then upwardly (Fig. 5) and carrying at its free end a finger $C^4$ which is adapted to shift the matrices from the elevator bar B into the rear distributer box. In accordance with my invention, a second finger $C^5$ is attached to the arm $C^3$ for transferring the detached matrices into the forward distributer box. When, therefore, the transfer slide C is operated, the two fingers $C^4$ and $C^5$ engage the two separated groups of matrices and push them into the respective distributer boxes E.

Means are also provided whereby the transfer of the notched matrices into the forward distributer box restores the supporting member F thereto at the same time, so that it will stand clear of the second elevator at the next operation thereof. To secure this result, the supporting member F is provided with a pair of pawls $F^6$, adapted to be thrown across the leading matrix of the separated group. One of the pawls is pivoted to the vertical portion of the supporting member and the other pivotally mounted upon a bracket $F^8$ rising at the opposite side from the horizontal portion of said member (Fig. 12). These pawls are formed with laterally projecting lips $F^7$ which are inclined with respect to the axes of the pawls and are adapted to be engaged by beveled or inclined abutments $e$ and $e^1$ arranged at the opposite ends of the forward distributer box. The outer abutments $e^1$ are arranged to engage the under faces of the projecting lips as the supporting member is withdrawn from the distributer box so as to rock the pawls inwardly to their active position behind the matrix group (Fig. 7); while the inner abutments $e$ are arranged to engage the upper faces of the lips when the supporting member is moved back within the distributer box so as to throw the pawls outwardly to inactive position out of the path of travel of the matrices (Figs. 5, 6 and 12).

The means for withdrawing the supporting member F from the distributer box remain to be described. In the present instance, the transfer slide C is relied upon for this purpose. When the second elevator begins its upward movement, the transfer slide occupies its inner position with its matrix engaging fingers within the distributer boxes, (Fig. 6), and the operating devices are timed so as to withdraw the fingers immediately that the elevator presents the composed line before the first distributer box. To permit such withdrawal, the finger $C^5$ is mounted so as to be swung downwardly from its vertical position to clear the matrices on the elevator bar B and when so depressed, the finger is operatively connected to the supporting member F so as to pull it out of the forward distributer box. As shown clearly in Figs. 5 and 8, the finger $C^5$ is fixed to a rock shaft $C^6$ journaled in the arm $C^3$ depending from the slide C. Surrounding the rock shaft $C^6$ is a torsional spring $C^9$ which tends constantly to rock the finger $C^5$ downwardly from its vertical position, but this tendency of the spring is normally overcome by a spring-actuated detent $C^8$ mounted in the arm $C^3$ and which engages in a recess of a crank arm $C^7$ fixed to the outer end of the rock shaft. The circular head portion of the detent $C^8$ is formed with a beveled or inclined notch $c$ which is adapted to be engaged by a small cam piece $C^{10}$ secured to the forward distributer box E near its entrance end (see also Figs. 6 and 9). The result is that as the finger $C^5$ is withdrawn from the distributer box, the locking detent $C^8$ as it passes the cam piece $C^{10}$ is disengaged from the crank arm $C^7$ (Fig. 9) and thus releases the rock shaft $C^6$, which is instantly rotated by the spring $C^9$ to throw the finger $C^5$ downwardly from its vertical position, the downward movement of the finger being limited by a stop pin $e^4$ on the rigid arm $C^3$. As indicated by the full lines in Figs. 10 and 11 and by the dotted lines in Figs. 6 and 7, the transfer finger $C^5$ is formed with a laterally projecting pin $c^1$ which in its depressed position is adapted to engage behind a lug $c^2$ projecting inwardly from the vertical portion of the supporting member F. In this way, the transfer finger $C^5$ is automatically connected to the supporting member F so as to move it along therewith out of the forward distributer box and into active relation to the other parts. When the supporting member F arrives in its proper position, the finger $C^5$ is disconnected therefrom by a fixed stop $A^{12}$ secured to a rigid arm $A^{13}$ and arranged in position to engage a stud $C^{11}$ projecting laterally from the lower end of the crank arm $C^7$, which, due to the continued movement of the transfer slide, effects the rotation of the rock shaft $C^6$ to restore the finger $C^5$ to its vertical position (see Fig. 6). The locking detent $C^8$ then snaps into the recess of the crank arm to hold the parts in their original position. It may be noted that the cam piece $C^{10}$ is pivotally mounted so as to permit the detent $C^8$ to clear it when the transfer finger $C^5$ is subsequently operated to carry the matrices into the distributer box.

The general operation of the parts will have been understood from the foregoing. To recapitulate, it may be stated that after casting the composed line, which includes or may include matrices of both fonts, is carried onto the ribbed bar B of the second elevator, which immediately rises to present the line to the first distributer box, where the elevator pauses for a brief period of time due to the extended concentric portion $B^9$ of the operating cam $B^8$. While the elevator remains momentarily in this position, the supporting member F is withdrawn from the first distributer box in the manner last described and located beneath the composed line on the elevator bar B. This movement of the supporting member F to active position shifts the locking piece G on the bar B to inactive position and allows the matrices to be presented to the action of the font selector $F^4$, which permits the notched matrices to drop to a lower level and become disengaged from the bar, but which supports the unnotched matrices at their original level and prevents their disengagement from the bar, thus effecting the separation of the matrices in groups according to form or font. By the time this separating action is completed, the elevator is caused to move on by its operating cam $B^8$ to present the ribbed bar with the notched matrices retained thereon in operative relation to the rear distributer box, when the elevator comes to rest. In this condition of the parts, the unnotched matrices remain engaged with the elevator bar, while the notched matrices are sustained by the supporting member F, which is still in its retracted position. The transfer slide C is now operated and by means of the fingers $C^4$ and $C^5$ pushes the two separated groups of matrices into their respective distributer boxes, the finger $C^4$ shifting the unnotched matrices endwise from the ribbed bar into the rear box, and the finger $C^5$ shifting the supporting member F and the notched matrices as a whole into the forward box, it being remembered that this shifting of the supporting member is effected by the engagement of the pawls $F^6$ thereon with the leading matrix of the group. When the two groups of matrices are thus pushed into the distributer boxes, the lifting fingers $E^5$, being operated in unison, feed them in pairs, one at a time from each box, to the two distributers D, which separate the matrices of the individual fonts according to character and restore them to their proper channels in the corresponding magazines. These operations are repeated for each composed line and at each cycle of operation of the machine.

I have herein shown my invention merely in preferred form and by way of example and as applied to a particular style of machine, and it will be obvious that many modifications and alterations therein and in its mode of application will suggest themselves to those skilled in the art without departure from its scope. Thus, many of the details of construction and their mode of operation may be variously modified without affecting the principle of the invention. It will also be understood that while the invention has been illustrated in connection with two distributers only, a greater number might be employed if desired. Generally speaking, I desire it to be understood that I do not limit myself to any specific form or embodiment, except in so far as such limitations are specified in the claims.

Having thus described my invention, its construction and mode of operation, what I claim and desire to secure by Letters Patent of the United States is as follows:

1. In a typographical machine, the combination of a plurality of distributers, a matrix transporter movable into operative relation to the distributer successively, and means whereby the appropriate matrices may be withdrawn from the transporter in its different operative positions and delivered to the respective distributers.

2. In a typographical machine, the combination of a plurality of distributers, a matrix transporter movable into operative relation to the distributers successively, and selecting means to coöperate with the transporter in its first position and effect the release therefrom of matrices belonging to the corresponding distributer.

3. In a typographical machine, the combination of a plurality of distributers, a matrix transporter movable into operative relation to the distributers successively, and means enabling the transporter in its first position to release matrices belonging to the corresponding distributer and then to carry the remaining matrices to the next distributer.

4. In a typographical machine, the combination of a plurality of distributers, a matrix transporter movable into operative relation to the distributers successively, means enabling the transporter in its first position to release matrices belonging to the corresponding distributer and then to carry the remaining matrices to the next distributer, and means for transferring the two separated groups of matrices to their respective distributers when the transporter arrives in its last position.

5. In a typographical machine, the combination of a plurality of distributers, a matrix transporter movable into operative relation to the distributers successively, selecting means to effect the release of matrices of a given form from the transporter and normally located out of its path of movement, and devices for bringing the selecting means into action when the transporter arrives in operative relation to the first distributer.

6. In a typographical machine comprising matrices of different forms, the combination of a plurality of distributers, a transporter with which the matrices are detachably engaged and movable into operative relation to the distributers successively, a locking device to retain the matrices on the transporter, and selecting means to render the locking device inactive when the transporter arrives in its first position and serving to permit or prevent the detachment of the matrices therefrom according to form.

7. In a typographical machine comprising matrices of different forms, the combination of a plurality of distributers, a transporter with which the matrices are detachably engaged and movable into operative relation to the distributers successively, and selecting means to coöperate with the matrices in the first position of the transporter and effect the disengagement therefrom of matrices of one form only; whereby the matrices may be delivered by the transporter to one distributer or another according to form.

8. In a typographical machine comprising matrices of different forms, the combination of a plurality of distributers, a transporter with which the matrices are detachably engaged and movable into operative relation to the distributers successively, selecting means to coöperate with the matrices in the first position of the transporter and effect the disengagement therefrom of matrices of one form only so as thus to separate the matrices in groups according to form, and means for subsequently transferring the two separated groups of matrices to their respective distributers.

9. In a typographical machine, the combination of a plurality of distributers each having a distributer box from which the matrices are fed thereto, a matrix transporter movable into operative relation to the distributer boxes successively and adapted in its first position to release the matrices belonging to the corresponding distributer, and means for receiving such released matrices and carrying them into the first distributer box.

10. In a typographical machine, the combination of a plurality of distributers each having a distributer box from which the matrices are fed thereto, a matrix transporter movable into operative relation to the distributer boxes successively and adapted in its first position to release the matrices belonging to the corresponding distributer, and a supporting member movable out of and into the first distributer box so as to receive the released matrices and carry them thereinto.

11. In a typographical machine, the combination of a plurality of distributers each having a distributer box from which the matrices are fed thereto, a matrix transporter movable into operative relation to the distributer boxes successively and adapted in its first position to release the matrices belonging to the corresponding distributer, a supporting member movable out of and into the first distributer box so as to receive the released matrices and carry them thereinto, and means for effecting the movements of the supporting member in proper synchonism with the operation of the matrix transporter.

12. In a typographical machine, the combination of a plurality of distributers each having a distributer box from which the matrices are fed thereto, a matrix transporter movable into operative relation to the distributer boxes successively, a matrix supporting member contained within the first distributer box and movable out of the same into coöperative relation to the transporter, and a selector acting in such relation of the parts to effect the release from the transporter of matrices belonging to the corresponding distributer.

13. In a typographical machine, the combination of a plurality of distributers each having a distributer box from which the matrices are fed thereto, a matrix transporter movable into operative relation to the distributer boxes successively, a matrix supporting member contained within the first distributer box and movable out of the same into coöperative relation to the transporter, and a selector carried by the supporting member and operative in such relation of the parts to effect the release from the transporter of matrices belonging to the corresponding distributer.

14. In a typographical machine, the combination of a distributer box, a matrix transporter movable into operative relation thereto, means for effecting the release of matrices from the transporter, and a matrix supporting member contained within the distributer box and movable into and out of the same, in the manner and for the purpose described.

15. In a typographical machine, the combination of a distributer box, a matrix transporter movable into operative relation thereto, means for effecting the release of matrices from the transporter, a matrix supporting member contained within the distributer box and movable into and out of the same, and transfer devices for effecting the movements of the supporting member.

16. In a typographical machine, the combination of a distributer box, a matrix transporter movable into operative relation thereto, means for effecting the release of matrices from the transporter, and a matrix supporting member contained within the distributer box and movable into and out of the same and provided at its inner end with a pair of automatic pawls, for the purpose described.

17. In a typographical machine, the combination of a distributer box, a matrix transporter movable into operative relation thereto, means for effecting the release of matrices from the transporter, a matrix supporting member movable into and out of the distributer box and provided with a slotted base plate, and a font selector bar carried by the supporting member and inserted in one or another of the slots of its base plate.

18. In a typographical machine, the combination of a composed line of matrices of different forms, a plurality of distributers, a matrix transporter adapted to release matrices of one form opposite the first distributer and to bring the remaining matrices opposite the next distributer, and common transfer means for shifting the two groups of matrices simultaneously toward their respective distributers.

19. In a typographical machine, the combination of a distributer box, a matrix transporter movable into operative relation thereto, and a transfer slide having a matrix engaging finger mounted so as to be movable downwardly on the return stroke of the slide, for the purpose described.

20. In a typographical machine, the combination of a distributer box, a line transfer slide having a matrix engaging finger movable into and out of the distributer box and mounted to be rocked upwardly and downwardly, and automatic means for effecting such rocking movements of the finger at predetermined intervals, in the manner and for the purpose described.

21. In a typographical machine, the combination of a plurality of distributers, a matrix transporter adapted at each cycle of operation to be presented in operative relation to the distributers successively, and actuating means acting automatically to effect such operation of the transporter.

22. In a typographical machine, the combination of a plurality of distributers, a transporter including a matrix sustaining bar and adapted at each cycle of operation to present such bar in operative relation to the distributers successively, actuating means acting automatically to effect such operation of the transporter, and guiding means to coöperate with the sustaining bar in both of its positions to insure its proper location with respect to the other parts.

23. In a typographical machine, the combination of a plurality of distributers, a line transporter movable into operative relation to the distributers successively and constructed to permit the disengagement of matrices therefrom, and a locking device carried by the transporter to prevent the disengagement of the matrices therefrom except at predetermined intervals.

24. In a typographical machine, the combination of a line transporter including the V-shaped bar B blank at one side and formed with the sustaining ribs $b$ at the other, and the automatic locking plate G carried by the elevator and serving when active to maintain the matrices in engagement with the sustaining ribs.

25. In a typographical machine, the combination of two distributers, separate matrix feeding devices therefor, and common operating means for both of said feeding devices.

26. In a typographical machine, the combination of two matrix lifting fingers, an integral supporting frame upon which they are mounted, and a single operating lever connected to the frame.

27. In a typographical machine, the combination of two matrix lifting fingers, an integral supporting frame upon which they are mounted, and a single operating lever connected to the frame and located in a plane situated between the two lifting fingers.

In testimony whereof, I have affixed my signature.

GEORGE P. KINGSBURY.

Witnesses:
 Edward Grant,
 E. H. Allen.

Copies of this patent may be obtained for five cents each, by addressing the "Commissioner of Patents, Washington, D. C."